United States Patent Office 2,870,192
Patented Jan. 20, 1959

2,870,192

TRICRESYLPHOSPHATE PROCESS

Kürt P. Bonstedt, Pittsburgh, Pa., assignor to Koppers Company, Inc., a corporation of Delaware No Drawing. Application December 30, 1957
Serial No. 705,780

10 Claims. (Cl. 260—461)

This application relates to the preparation of tricresylphosphate, a valuable fuel oil additive known commercially as T. C. P. In one specific aspect, it relates to an improved method for obtaining tricresylphosphate in increased yields under carefully controlled process conditions.

The reaction between cresylic acid and phosphorus oxychloride to form tricresylphosphate is well known. Commercial cresylic acid is a mixture of various homologs and isomers of cresol. For example, a readily available commercial grade of this material, viz: e. g. grade, comprises 46% meta cresol, 26% para cresol, 23% xylenols and about 4% of other tar acids. Cresylic acid reacts with phosphorus oxychloride in the manner indicated hereunder:

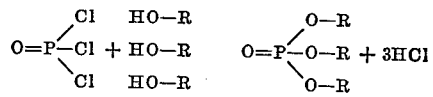

R in the above equation is a methyl or ethyl mono or di- substituted phenyl radical. The reaction proceeds step-wise with the formation of the following intermediates:

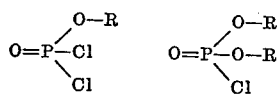

The first intermediate, the monoester phosphoric acid dichloride, has somewhat the same reactivity as the phosphorus oxychloride. The second intermediate, the diester monochloride, is much less reactive. It reacts very slowly with phenolic groups to form the desired tricresyl phosphate.

A commercially acceptable tricresylphosphate contains little or no diester chloride. This particular ester hydrolyzes readily to form HCl; thus tricresylphosphate contaminated therewith may become too acid and therefore of diminished utility. Since the removal of the undesirable ester from the crude product is tedious and costly, efforts have been made to obtain a substantially complete reaction and obviate eliminating the diester using purification techniques.

It has been proposed to use an excess of cresylic acid in the initial reaction mixture, but efforts in this direction have not been rewarded with any great degree of success. Even with the use of active catalysts and high temperatures it is possible to eliminate the troublesome diester only by lengthening the reaction time to a point wherein the process becomes economically unattractive.

The processes based upon the foregoing concepts result in yields of from 80 to 85% of the desired tricresylphosphate. I have discovered a novel method wherein the reaction can be completed within a reasonable time and the amount of intermediate diester monochloride can be reduced to very small traces. The use of my new method results in a 10 to 15% increase in yield over that obtained using the prior art practices.

It is, therefore, an object of the present invention to provide an improved process for making tricresylphosphate wherein increased yields of product, substantially free of undesirable intermediates, are obtained.

In accordance with the present invention I have discovered that the mixed phenolic compounds comprising the commercial cresylic acid show a marked difference in reactivity toward the phosphorus oxychloride. As the reaction nears completion only the less reactive phenolic compounds remain. Since the diester monochloride itself reacts slowly with phenolic groups, it is virtually impossible to promote the reaction between this compound and the less reactive phenolic compounds within a reasonable length of time. This is true even with the use of high reaction temperatures and active catalysts. Surprisingly enough, I have found that the remaining diester monochloride can be converted in a timely manner by adding, after the reaction reaches about 90 to 96% completion, an excess of fresh anhydrous cresylic acid sufficient to supply a quantity of active phenolic compounds (at least equal to the quantity of less reactive phenolic compounds present in the reaction mixture) to react with the diester. Generally from 3 to 12% (based on the weight of the reactant cresylic acid) is sufficient for this purpose. I prefer to use from 3 to 7%, since any excess cresylic acid must be removed in the purification step in the manner hereinafter indicated. Reaction between the diester monochloride and the newly added, more reactive phenolic compounds is promoted primarily by high temperatures rather than by catalytic means, since the catalysts generally employed decompose at temperatures below that at which 90 to 96% completion is attained. For purposes of the present invention it is necessary to use essentially anhydrous starting materials. The presence of moisture in amounts as low as 0.3% is harmful, since water favors formation of less reactive intermediates, thus tending to reduce the ultimate yield of tricresylphosphate.

Dehydrated cresylic acid and substantially anhydrous phosphorus oxychloride are admixed in stoichiometric quantities in the presence of an anhydrous condensation or Friedel-Crafts type catalyst. Suitable catalysts include, but are not limited to, the chlorides of Al, Fe, Cr, Ti, Sn, Zn, Mg or Ca and various organic bases. Any excess of the phosphorus oxychloride must be avoided, since this would result in the presence of undesirable intermediates in the final product. An excess of cresylic acid may be used, but no particular advantage is derived thereby. Any excess of cresylic acid is distilled off in the purification step and returned to the process by admixing it with fresh cresylic acid.

The catalyst is conveniently used as an anhydrous powder in amounts ranging from 0.1 to 2% based on the weight of the reactants. If less than 0.1% by weight of catalyst is used, the reaction time is unduly prolonged. An excess of catalyst is also undesirable, since the final reaction temperature is generally above that at which the catalyst decomposes. Separation of the decomposition products from the tricresylphosphate is often troublesome.

The mixture of cresylic acid, phosphorus oxychloride and catalyst is heated to a temperature of about 60 to 80° C. The reaction starts at that temperature with evolution of hydrogen chloride, which is absorbed in water to form an aqueous solution of hydrochloric acid. This acid solution affords a convenient way to measure the degree of completion of the reaction. Since the quantities of reactants are carefully controlled, the amount of HCl given off may be measured with reasonable accuracy. Thus, the degree of completion of the reaction can be quickly determined by a simple titration.

Any cresylic acid or phosphorus oxychloride that is vaporized during the heating step can be refluxed and returned to the reaction vessel.

The temperature in the reaction vessel is gradually increased to a final temperature of from about 225 to 240° C. 90-96% conversion (determined by measuring the amount of HCl evolved) is generally reached at a temperature above about 200 to 230° C. At this point about 3 to 12% excess of cresylic acid (based upon the quantity thereof originally present in the reaction mixture) is added. The reaction is continued until the diester chloride and the various other intermediates are completely converted to tricresylphosphate. Completion of the reaction generally occurs in about 5 to 10 hours and is measured by the amount of HCl evolved.

When aluminum chloride is used as a catalytic material for making tricresylphosphate it decomposes at a temperature of from about 170 to 180° C. to form an organic aluminum phosphate. Since this material shows no catalytic activity herein, the reaction must be forced to completion with heat alone. Heat by itself fails to promote the reaction between the diester chloride and the less reactive phenolic compounds within a reasonable period of time.

After the completion of the reaction the crude reaction mixture may be filtered to remove the insoluble organic aluminum phosphates and other impurities. This filtration step is not essential, since the insoluble material can be disposed of in the bottoms during fractional distillation.

The completely reacted crude mixture is transferred into a vacuum still. At a vacuum of about 25 mm. Hg the excess of cresylic acid is distilled off and recycled for use in the next reaction. The vacuum is then lowered to 2 mm. Hg and the temperature is raised up to the boiling point of tricresylphosphate (about 230° C. at 2 mm. Hg).

The distillation is continued and the first cut of product, consisting of about 15% of the tricresylphosphate plateau containing small amounts of impurities, is separated. This cut is recycled for admixture with the crude reacted mixture from the succeeding batch for distillation. The temperature at which the cut is taken varies from 232 to 239° C., depending upon the composition of the starting cresylic acid. The amount of the cut is more conveniently measured by weight, e. g. 15% tricresylphosphate, rather than by a particular distillation temperature.

The second cut of tricresylphosphate represents the heart cut. It comes off at temperatures ranging from 236 to 244° C. and amounts to about 80% of the tricresylphosphate plateau. This cut is admixed with about 2 to 5% by weight of activated charcoal (e. g. Nuchar, a commercially available charcoal used for purification) and heated to about 100 to 120° C. with continuous agitation. Purification is accomplished above 100° C. to avoid absorption of the moisture of the charcoal by the tricresylphosphate. The purified tricresylphosphate is filtered until clear and transferred to storage facilities.

The third cut of product is combined with the first product cut and is recycled therewith into the distillation of the next batch. The head temperature in the distillation of the third cut is about 240 to 248° C. and the temperature in the still is about 290° C.

The residue in the still is drained off while still hot and is discarded.

Succeeding runs are made in the same way as the first with the exception that the cresylic acid recovered as forerunnings from the previous run is recycled thereto and correspondingly less cresylic acid is used to make up the designated amount of starting reactant.

The distillation of the succeeding batches differs from that of the first in that the first and third tricresylphosphate cuts from the previous distillation are distilled along with the crude mixture obtained on completion of the reaction. The amount of first and third cuts in the subsequent distillations is substantially constant. After several recycles the amount of impurities in the distillation step will build up to a point wherein it is desirable to bleed them off to avoid product contamination.

My new method can readily be modified for continuous operation. This can be accomplished by providing a series of reaction vessels and cascading the reactants from one to another with a predetermined holding time in each vessel. The temperature is increased stepwise in each succeeding vessel up to a temperature of about 200 to 230° C. in the final vessel (or stage). For example, if three stages are used the temperatures in those stages may be: (1) 60-90° C., (2) 140-170° C. and (3) 200-230° C. In the final stage 90-100% completion of the reaction will be reached. The 3-12% excess of fresh cresylic acid is added thereto to react with diester chloride or other intermediate that is present. The product is withdrawn continuously from the final stage. Distillation can be accomplished in a continuous manner by providing a series of distillation columns.

My invention is further illustrated by the following examples.

EXAMPLE I

The reaction vessel was charged with 1545 kg. of dehydrated cresylic acid, E. G. grade and 7.7 kg. of anhydrous aluminum chloride powder. To this mixture 710 kg. of anhydrous phosphorous oxychloride were added. The reaction mixture was heated, and at a temperature of from about 60-80° C. evolution of hydrogen chloride was observed. The outgoing stream of gas was cooled using a series of two condensers, a first condenser containing water and a second condenser containing a refrigerant at a temperature of about −10 to −30° C. The condensers were used to avoid loss of cresylic acid and phosphorus oxychloride that were entrained in the outgoing HCl stream. The reactants were returned by reflux to the reaction mixture. The outgoing hydrogen chloride evolved during the process (total amount 506 kg.) was absorbed in water to form an aqueous solution of hydrochloric acid.

The temperature in the reaction vessel was gradually increased up to a final temperature of 230° C. At a temperature of from 210-220° C. 95% conversion (determined by the amount of HCl evolved) was reached. At this point a 5% by weight excess of cresylic acid (77 kg.) was added. After the reaction was complete, the crude mixture, weighing 1834 kg., was transferred to a vacuum still. The total reaction time was about six hours.

At a vacuum of about 25 mm. Hg the excess of cresylic acid was distilled off. The recovered portion, weighing about 80 kg., was recycled to the next reaction batch.

The vacuum was then lowered to 2 mm. Hg and the temperature was raised to the boiling point of the tricresyl phosphate. The first cut of tricresylphosphate (weighing about 240 kg.) was taken at 238° C. and collected separately.

The second cut, representing the heart cut, was taken at 244° C. It weighed about 1400 kg. It was transferred to an agitated kettle and therein admixed with about 3% of Nuchar, a commercially available activated charcoal used for purification. The mixture was heated from 100-120° C. and filtered clear. The tricresylphosphate product was transferred to a storage tank.

The third cut of the tricresylphosphate (about 80 kg.) was combined with the first cut, and both cuts were recycled into the distillation of the next batch. The head temperature in the distillation of the third cut was 246° C. and the temperature in the still was about 290° C.

The residue in the still was drained off while still hot and discarded.

EXAMPLE II

Two succeeding runs were made in the same manner as the first. These runs differed in that the cresylic acid recovered from the previous run (compare Example I) was recycled and correspondingly less fresh cresylic acid was used to make up the starting total of 1545 kg.

The distillation of the second and third batches followed the procedure outlined in the first run, with the exception that the first and third tricresylphosphate cuts of the previous distillation were added to the crude reacted mixture to bring the charge up to a total of 2154 kg. The purified heart cut from these runs weighed about 1720 kg.

EXAMPLE III

Following the procedure described in the previous examples, a series of runs were made to determine (1) the effect on reaction rate of increased amounts of recycled cresylic acid present in the starting reactant and (2) the effect on reaction rate of increased amounts of catalysts. The degree of completion of the reaction and temperature of the reaction mixture was measured after periods of one and two hours. The time required to complete the reaction and the final reaction temperature were recorded. The data are shown hereunder in Table I.

It should be noted that in runs 45, 47 and 48 0.2% by weight aluminum chloride was used as a catalyst during the reaction. In runs 49, 50 and 51 the amount of catalyst was increased to 0.5%.

EXAMPLE V

The products of Example IV were purified in the manner hereinbefore described using about 3% Nuchar. The quality of the product was determined by testing for oxidizable materials, moisture, acidity, color and odor by standard ASTM procedures (adopted 1936; revised 1946, 1949, 1956). The presence of oxidizable materials was determined by ASTM Procedure D-268, requiring the color of added $KMnO_4$ to be retained for at least 30 minutes. Moisture (ASTM Procedure D 1364) must be less than 0.1%. Acidity, by ASTM standards, must be not more than that titratable by 0.1 mg. KOH/g. Color must be not more than 100 by a Pt-Co Scale (ASTM Procedure D-1209. Odor by ASTM Procedure D-1209 must be faint.

The results of these tests are shown below in Table III.

Table I
PREPARATION OF TRICRESYLPHOSPHATE REACTION RATES OF ESTERIFICATION WITH RECYCLED CRESYLIC ACID

| Run No. | Percent $AlCl_3$ | Recycle No. | Reaction after | | | | 100% Reaction | |
|---|---|---|---|---|---|---|---|---|
| | | | 1 hour | | 2 hours | | After hours | Final Temp., °C. |
| | | | Percent | °C. | Percent | °C. | | |
| 39 | 0.2 | start | 32 | 102 | 74 | 160 | 8 | 225 |
| 43 | 0.2 | 1 | 12 | 100 | 53 | 153 | 10 | 225 |
| 45 | 0.2 | 2 | 15 | 112 | 41 | 155 | 8 | 225 |
| 48 | 0.2 | 3 | 5.5 | 132 | 20 | 162 | 10 | 225 |
| 42 | 0.2 | start | 32 | 110 | 67 | 158 | 6 | 225 |
| 44 | 0.2 | 1 | 21 | 112 | 55 | 154 | 10 | 225 |
| 47 | 0.2 | 2 | 12 | 125 | 38 | 170 | 10 | 225 |
| 49 | 0.5 | 3 | 42 | 100 | 86 | 170 | 5 | 225 |
| 50 | 0.5 | 4 | 63 | 125 | 87 | 173 | 5 | 225 |
| 51 | 0.5 | 5 | 67 | 128 | 86 | 171 | 5 | 225 |

EXAMPLE IV

Using the procedure of Example I, a series of runs were made to obtain material balance data on the process. The data are shown below in Table II.

Table III
PREPARATION OF TRICRESYLPHOSPHATE QUALITY OF PRODUCT TCP FROM "DRY RECYCLE PROCESS"

| Run No. | Yield, Percent before Charcoal Treatment | After Charcoal Treatment (3% Nuchar) | | | | |
|---|---|---|---|---|---|---|
| | | $KMnO_4$ Test, min. | Water Content, Wt. percent | Acidity, mg. KOH/gram | Color, A. P. H. A. | Odor |
| ASTM std. specs | | 30 | <0.1 | <0.1 | <100 | faint. |
| 45 | 75.5 | >30 | <0.1 | <0.02 | 10 | none. |
| 47 | 93.2 | >30 | <0.1 | <0.02 | 15 | none. |
| 48 | 92.4 | >30 | <0.1 | <0.02 | 10 | none. |
| 49 | 97.4 | >30 | <0.1 | <0.02 | 18 | none. |
| 50 | 98.0 | >30 | <0.1 | <0.02 | 18 | none. |
| 51 [1] | 98.0 | >30 | <0.1 | <0.02 | 10 | none. |

[1] Treated with 3%+1% of Nuchar. Distillation was interrupted.

It is readily apparent from the data that the product obtainable by my new method is excellent in respect of ASTM standards.

Table II
PREPARATION OF TRICRESYLPHOSPHATE WEIGHT BALANCE

| Run No. | 45 | 47 | 48 | 49 | 50 | 51 |
|---|---|---|---|---|---|---|
| Theoretical yield, grams based on reacted cresylic acid | 1,739 | 1,737 | 1,704 | 1,750 | 1,744 | 1,745. |
| Cut 1 and 3 TCP, recycled, percent | 18.4 | | | | | |
| Heartcut TCP, percent | 75.5 | 93.2 | 92.4 | 97.4 | 98.0 | 98.0. |
| subtotal, percent | 93.9 | | | | | |
| Loss with precipitate, percent | 1.5 | 1.9 | 3.3 | 0.5 | not filtered | not filtered. |
| Residue, percent | 3.7 | 3.4 | 3.0 | 2.1 | 2.0 | 2.0. |
| Total amount accounted, percent | 99.1 | 98.5 | 98.7 | 100.0 | 100.0 | 100.0. |

I have thus provided a novel method for making a highly pure tricresylphosphate in yields ranging from about 93 to 98%. This desirable product is an excellent fuel oil additive and well established plasticizer in the field of synthetic resins. Using my recycle distillation process I have avoided the hydrolysis of tricresylphosphate that obtains in processes wherein the crude product is purified by washing with caustic. I have also avoided the multiple washing steps generally required in wet process purification techniques. Elimination of these additional steps represents a considerable saving in equipment cost.

I claim:

1. A method of making tricresylphosphate comprising contacting substantially anhydrous cresylic acid and substantially anhydrous phosphorus oxychloride in at least a 3:1 mole ratio in the presence of an anhydrous condensation catalyst, heating the reaction mixture until about 90 to 96% completion of the reaction occurs, adding to said mixture about 3 to 12% by weight of fresh cresylic acid based on the weight of cresylic acid originally present, continuing heating until the completion of the reaction and recovering tricresylphosphate from said mixture.

2. A method of making tricresylphosphate comprising contacting anhydrous cresylic acid and anhydrous phosphorus oxychloride in substantially stoichiometric quantities in the presence of an anhydrous chloride selected from the group consisting of Al, Fe, Cr, Ti, Sn, Sb, Zn, and Mg chlorides, heating the reaction mixture until about 90 to 96% completion of the reaction occurs, adding to said mixture about 3 to 7% by weight of fresh anhydrous cresylic acid based on the weight of cresylic acid originally present, continuing heating said mixture up to a temperature of about 225 to 240° C. until the completion of the reaction and recovering tricresylphosphate therefrom by fractional distillation.

3. A method of making tricresylphosphate comprising contacting substantially anhydrous cresylic acid and substantially anhydrous phosphorus oxychloride in at least a 3:1 mole ratio in the presence of 0.1 to 2% by weight of anhydrous aluminum chloride, heating the reaction mixture to a temperature up to above 200° C. at which about 95% completion of the reaction occurs, adding to said mixture about 5% by weight of fresh anhydrous cresylic acid based on the weight of cresylic acid originally present, continuing heating said mixture up to a temperature of about 225 to 230° C. until the completion of the reaction and recovering tricresylphosphate therefrom by fractional distillation.

4. A method according to claim 3 wherein the reaction time is about 5 to 10 hours.

5. A method according to claim 3 wherein 95% completion and completion of the reaction are determined by the amount of hydrogen chloride evolved.

6. A method of making tricresylphosphate comprising contacting substantially anhydrous cresylic acid and substantially anhydrous phosphorus oxychloride in at least a 3:1 mole ratio in the presence of 0.1 to 2% by weight of anhydrous aluminum chloride, heating the reaction mixture to a temperature up to above 200° C. at which about 90 to 96% completion of the reaction occurs, adding to said mixture about 3 to 7% by weight of fresh anhydrous cresylic acid based on the weight of cresylic acid originally present, continuing heating said mixture up to a temperature of about 225 to 230° C. until the completion of the reaction, filtering the completely reacted crude mixture and recovering tricresylphosphate therefrom by fractional distillation.

7. A method of making tricresylphosphate comprising contacting substantially anhydrous cresylic acid and substantially anhydrous phosphorus oxychloride in at least a 3:1 mole ratio in the presence of 0.1 to 2% by weight anhydrous aluminum chloride, heating the reaction mixture to a temperature up to above 200° C. at which about 90 to 96% completion of the reaction occurs, adding to said mixture about 3 to 7% by weight of fresh anhydrous cresylic acid based on the weight of cresylic acid originally present, continuing heating said mixture up to a temperature of about 225 to 230° C. until the completion of the reaction, transferring the completely reacted crude mixture to a vacuum still, separating said crude mixture therein into cuts comprising (1) forerunnings, (2) heart cut of product, and (3) cuts containing product contaminated with impurities, treating said heart cut with activated charcoal, and recovering substantially pure tricresylphosphate therefrom.

8. A method according to claim 7 wherein the forerunnings are recycled to the next reaction, the cuts containing impurities are recycled to the next distillation and the bottoms are discarded.

9. A method according to claim 7 wherein the charcoal treatment is carried out at temperatures of 100 to 120° C.

10. A method of making tricresylphosphate comprising continuously contacting substantially anhydrous cresylic acid and substantially anhydrous phosphorus oxychloride in at least a 3:1 mole ratio in the presence of 0.1 to 2% of anhydrous aluminum chloride, continuously transferring measured portions of the reaction mixture through a series of progressive stages, continuously maintaining increased temperatures in each succeeding stage up to a temperature of from about 200 to 230° C. in the final stage wherein about 90 to 100% completion of the reaction occurs, continuously adding to said final stage about 3 to 7% by weight of fresh anhydrous cresylic acid based on the weight of cresylic acid originally present, continuously withdrawing completely reacted crude mixture from said final stage and continuously recovering tricresylphosphate from said crude mixture by fractional distillation.

No references cited.

UNITED STATES PATENT OFFICE

CERTIFICATE OF CORRECTION

Patent No. 2,870,192 January 20, 1959

Kürt P. Bonstedt

It is hereby certified that error appears in the printed specification of the above numbered patent requiring correction and that the said Letters Patent should read as corrected below.

Column 1, line 25, for "e. g." read -- E. G. --; column 2, line 44, for "Sn, Zn," read -- Sn, Sb, Zn, --.

Signed and sealed this 26th day of May 1959.

(SEAL)
Attest:

KARL H. AXLINE
Attesting Officer

ROBERT C. WATSON
Commissioner of Patents